US010391666B2

(12) United States Patent
Maurer et al.

(10) Patent No.: US 10,391,666 B2
(45) Date of Patent: Aug. 27, 2019

(54) MACHINING DEVICE FOR MACHINING A WORKPIECE BY MEANS OF AT LEAST ONE FLUID JET

(75) Inventors: Walter Maurer, Oftringen (CH); Franz Helmhart, Langenthal (CH)

(73) Assignee: MICROWATERJET AG, Aarwangen (CH)

(*) Notice: Subject to any disclaimer, the term of this patent is extended or adjusted under 35 U.S.C. 154(b) by 1691 days.

(21) Appl. No.: 12/968,729

(22) Filed: Dec. 15, 2010

(65) Prior Publication Data

US 2011/0146467 A1 Jun. 23, 2011

(30) Foreign Application Priority Data

Dec. 17, 2009 (CH) ....................................... 1936/09

(51) Int. Cl.
*B62D 7/00* (2006.01)
*B26F 3/00* (2006.01)
*B26D 7/00* (2006.01)

(52) U.S. Cl.
CPC ................ *B26F 3/008* (2013.01); *B26D 7/00* (2013.01); *B26F 3/004* (2013.01); *Y10T 83/364* (2015.04)

(58) Field of Classification Search
CPC ............. Y10T 83/0591; Y10T 83/0443; Y10T 83/0453; Y10T 83/364; B26D 7/00; B26D 7/01; B26D 7/0658; B26D 2007/0018; B24C 1/00; B24C 3/28; B24C 5/02
USPC ......................................... 83/22, 24, 53, 177
See application file for complete search history.

(56) References Cited

U.S. PATENT DOCUMENTS

| | | | | |
|---|---|---|---|---|
| 4,204,448 | A * | 5/1980 | Pearl | 83/177 |
| 4,656,791 | A * | 4/1987 | Herrington et al. | 451/38 |
| 5,003,729 | A * | 4/1991 | Sherby | 451/38 |
| 5,349,788 | A * | 9/1994 | Nedo et al. | 451/75 |
| 5,472,367 | A * | 12/1995 | Slocum et al. | 451/5 |
| 5,908,349 | A | 6/1999 | Warehime | |
| 6,955,585 | B2 * | 10/2005 | Mitsuishi | B24C 1/04 451/36 |
| 7,455,568 | B2 * | 11/2008 | Sekiya | 451/2 |
| 2007/0209491 | A1 * | 9/2007 | Gadd | 83/13 |

FOREIGN PATENT DOCUMENTS

| | | |
|---|---|---|
| DE | 8518255 U1 | 9/1985 |
| EP | 0927597 A1 | 7/1999 |

OTHER PUBLICATIONS

Swiss Search Report, dated Apr. 6, 2010, from corresponding Swiss application.

* cited by examiner

*Primary Examiner* — Phong H Nguyen
(74) *Attorney, Agent, or Firm* — Young & Thompson

(57) ABSTRACT

A machining device for machining a workpiece with at least one fluid jet includes a workpiece support (20) for supporting the workpiece and a catch basin (29) for dissipating the energy of the at least one fluid jet after its penetration of the workpiece. The catch basin (29) is arranged in a free-standing manner in relation to the workpiece support (20) in order to avoid the transmission of vibrations from the catch basin to the workpiece support.

8 Claims, 3 Drawing Sheets

PRIOR ART

MACHINING DEVICE FOR MACHINING A WORKPIECE BY MEANS OF AT LEAST ONE FLUID JET

FIELD OF THE INVENTION

The invention relates to a machining device for machining a workpiece by means of at least one fluid jet, comprising a workpiece support for supporting the workpiece, and a catch basin for dissipating the energy of the at least one fluid jet after its penetration of the workpiece.

BACKGROUND OF THE INVENTION

In operation, the machining device produces a fluid jet, e.g. a waterjet, which penetrates a material that is to be cut and thus divides the latter into two or more parts. After penetrating the material, the waterjet has a certain residual energy that is dissipated in a catch basin (also called "jet catcher") that is generally filled with water.

While the residual energy is dissipated in the catch basin, the latter may start to vibrate. The devices that are available on the market are designed as a unit where the catch basin and the workpiece support are fixedly connected to a frame. FIG. 5 shows such a device of the prior art with a frame construction 10' to which catch basin 29' and workpiece support 20' for a workpiece 21' are fixed. Due to this construction, the vibrations produced by catch basin 29' are transmitted via frame construction 10' to workpiece support 20' and ultimately to workpiece 21'. This makes an accurate machining of workpiece 21' difficult.

It is also known in the art to fasten the workpiece support directly to the catch basin and to arrange this unit separately from the remainder of the device. This construction is even more disadvantageous with regard to vibration transmission as the vibrations of the catch basin generated in operation are directly transmitted to the workpiece support. Still other influences such as vibrations of the floor may be transmitted to the workpiece and/or the catch basin along with the workpiece support and the workpiece that is to be cut may even be dislocated from the remainder of the device. Overall, undesirable machining inaccuracies and thus a loss in quality are the result.

SUMMARY OF THE INVENTION

It is an object of the present invention to provide a machining device that allows an accurate machining of workpieces. This is accomplished with the machining device of the invention.

In the machining device of the invention, the catch basin is arranged in a free-standing manner in relation to the workpiece support. Due to this decoupled arrangement, the transmission of vibrations from the catch basin to the workpiece support can be prevented. In this manner, a workpiece is machinable more accurately.

BRIEF DESCRIPTION OF THE DRAWINGS

Further specific constructive features and their advantages will become apparent from the following description and the drawings of an exemplary embodiment.

DETAILED DESCRIPTION OF THE PREFERRED EMBODIMENTS

Figure 1:
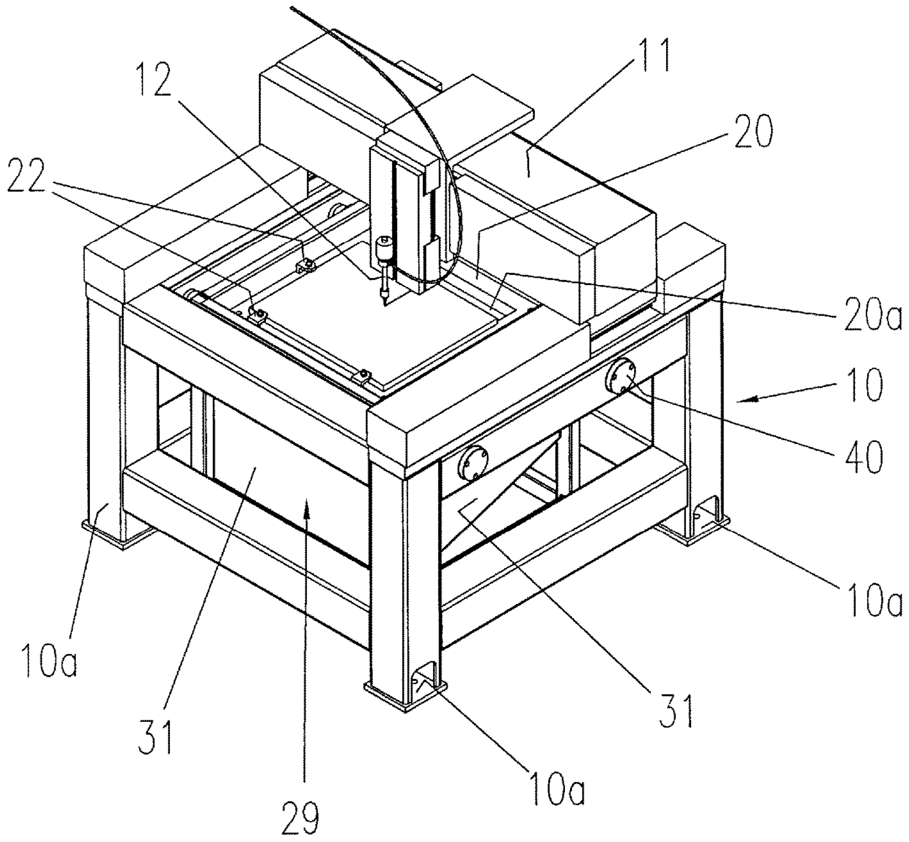
FIG. 1 shows a perspective view of a machining device according to the invention.
Figure 2:
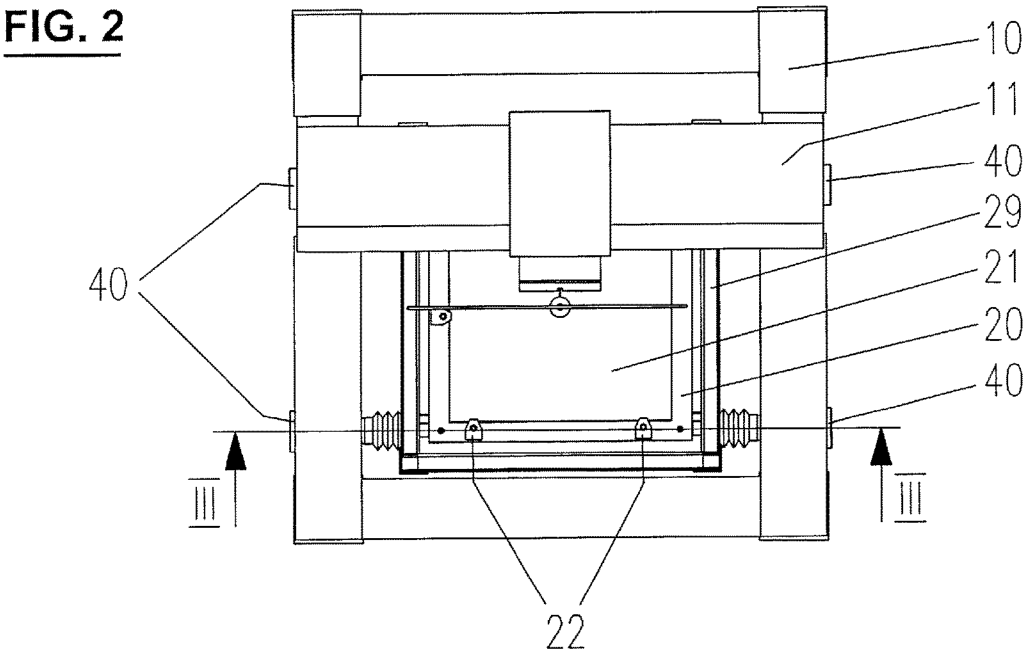
FIG. 2 shows a top view of the device according to FIG. 1.

As shown in FIGS. 1 and 2, the machining device has a machine support 10 in the form of a first frame construction standing on the floor via support feet 10*a*. The latter are provided with holes allowing to screw first frame construction 10 to the floor. On a displaceable bridge 11, a cutting head 12 is arranged that is displaceable transversally to bridge 11. The cutting head 12 is thus movable in the plane. In addition, the cutting head 12 is displaceable vertically to the plane and is thus movable in at least three independent axes. The machining device is equipped with the usual components for producing a fluid jet in operation, e.g. a waterjet, which cuts a material layer along a contour as it is discharged from cutting head 12.

The machining device comprises a workpiece support 20 on which a workpiece 21 to be machined is supported. In the present exemplary embodiment, workpiece support 20 is provided in its inner area with a cutout 20*a*, thus forming a frame which supports the workpiece 21 at its edge.

Figure 3:
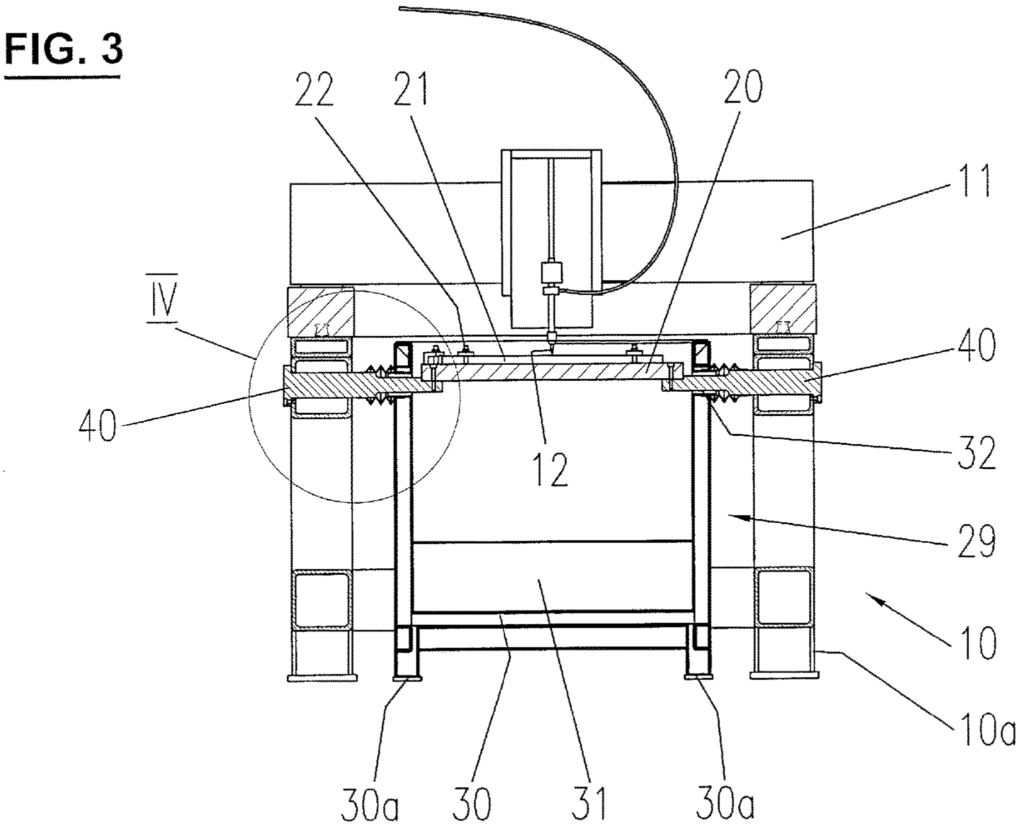
FIG. 3 shows a cross-section of the device in plane III-III of FIG. 2.

As shown in FIG. 3 also, the machining device is provided with retaining means 22 for retaining workpiece 21. Retaining means 22 are e.g. in the form of clamps by means of which workpiece 21 is pressed against workpiece support 20.

Within the first frame construction 10, a catch basin 29 is arranged. The latter comprises a second frame construction 30 standing on the floor via feet 30*a*. The latter are provided with holes for screwing second frame construction 30 to the floor.

Feet 30*a* of the second frame construction 30 as well as support feet 10*a* of the first frame construction 10 may be provided with damper elements so that vibrations are not transmitted between frame construction 30 or 10 and the floor or are transmitted only in a damped manner.

Catch basin 29 has a sufficient depth for allowing an efficient dissipation of the residual energy of the fluid jet, which it has after its penetration of the workpiece 21 being cut. The four side walls as well as the bottom of second frame construction 30 are closed by respective plates 31 so that a container which is open on the top is formed. The side walls 31 of catch basin 29 extend beyond the level at which the workpiece support 20 is located. This allows the catch basin 29 to be filled with water up to workpiece 21. Thus, the fluid jet, when passing the underside of the workpiece 21, enters directly the water body.

Figure 4:
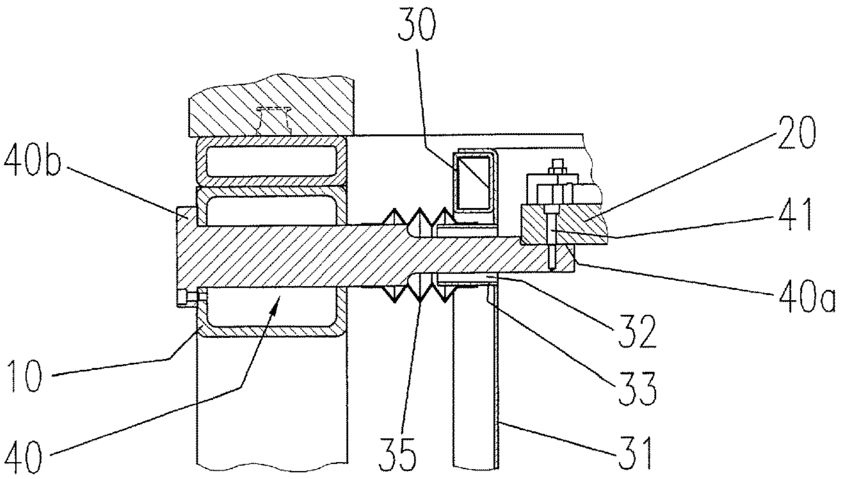
FIG. 4 shows a detail view from FIG. 3.
Figure 5:
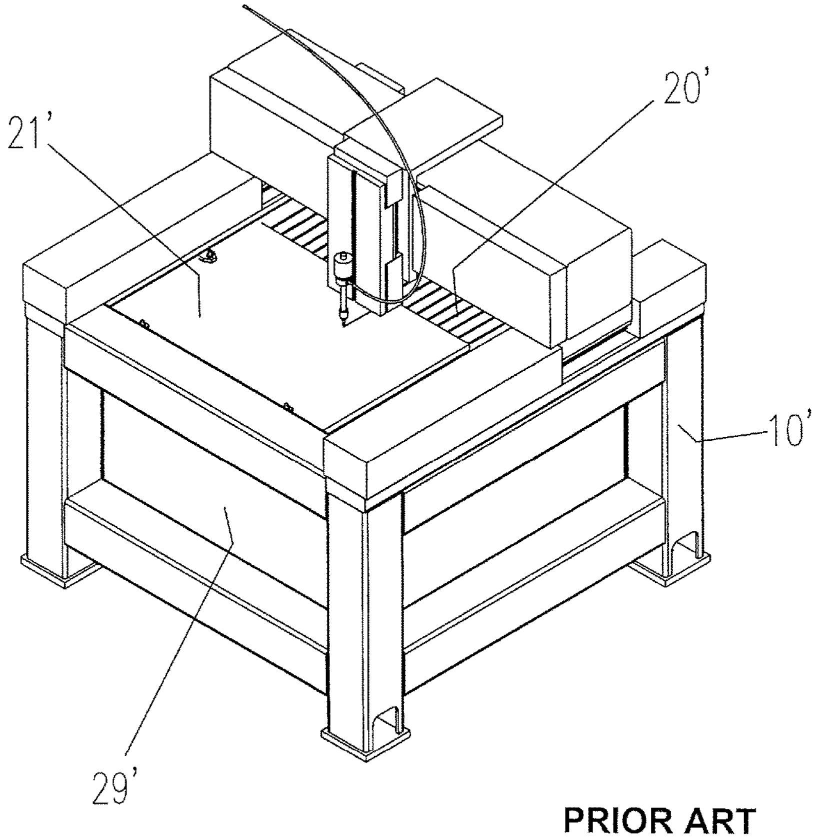
FIG. 5 shows a perspective view of a machining device of the prior art.

As also shown in the detail view of FIG. 4, two opposite side walls 31 of catch basin 29 are provided with passages 32 through which respective fastening elements 40 extend. The diameter of passage 32 is sufficiently large to avoid that the respective fastening element 40 contacts side wall 31 of catch basin 29, not even when catch basin 29 and machine support 10 vibrate reciprocally in operation.

Each fastening element 40 is in the form of a bolt whose inner end forms a bearing surface 40*a* and whose outer end is provided with a flange 40*b*. Workpiece support 20 rests on bearing surface 40*a* and is connected thereto via a detachable connection 41, e.g. a screw connection. The outer end of bolt 40 is passed through an opening in first frame construction 10 and fastened thereto by flange 40*b*.

In the present exemplary embodiment, passage 32 is surrounded by a tube portion 33 that is fastened to side wall 31 of catch basin 29. A seal 35 e.g. in the form of a collar made of rubber is provided for, the ends of the collar enclosing tube portion 33 and bolt 40.

For the assembly of the machining device, catch basin 29 and the unit formed by components 10, 11, 12, 20, 22 are positioned separately from each other and—if required—fastened to the floor.

In operation, catch basin 29 is filled with water. Workpiece 21 rests on workpiece support 20 and is secured by retaining means 22. The contour along which workpiece 21 is cut lies within cutout 20*a* of workpiece support 20 so that the fluid jet exiting the underside of workpiece 21 may pass through workpiece support 20 unhindered and propagate in the water of catch basin 29. There the residual energy of the fluid jet is absorbed, which may cause vibrations of catch basin 29.

The actual machining device with machine support 10 and displaceable cutting head 12 forms together with fixedly connected workpiece support 20 a separate unit that is decoupled from catch basin 29. Consequently, catch basin 29 is free-standing and arranged independently from workpiece support 20. Due to this arrangement, vibrations of catch basin 29 that are caused by the dissipation of the residual energy or alternatively by other influences such as possible vibrations of the floor cannot be transmitted to workpiece support 20 and therefore neither to workpiece 21. As a result, the fluid jet is precisely displaceable with respect to workpiece 21 so that a very accurate machining is possible.

Seals 35 between the two frame constructions 10 and 30 prevent that water may exit through passages 32.

The isolated arrangement of the catch basin 29 from the workpiece support 20 is applicable in various fluid jet machining techniques in order to achieve accurate machining, e.g. in pure water cutting, abrasive cutting where abrasive particles are added to the water, and/or in cutting by means of other types of liquids.

From the preceding description, numerous modifications are accessible to one skilled in the art without departing from the scope of protection of the invention that is defined by the claims.

Thus it may be contemplated to use more than one cutting head in the machining device in order to make the machining process more efficient.

Instead of the four bolts 40, other types of fastening means may be contemplated for fastening workpiece support 20 to machine support 10.

In catch basin 29 additional obstacles such as baffle plates or the like may be provided in order to allow a more efficient dissipation of the residual energy of the fluid jet.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A machining device for machining a workpiece by means of at least one fluid jet, comprising a workpiece support for supporting the workpiece, and a catch basin for dissipating the energy of the at least one fluid jet after its penetration of the workpiece, wherein the catch basin is arranged in a self-supporting manner in relation to the workpiece support in order to avoid the transmission of vibrations from the catch basin to the workpiece support, and wherein the catch basin includes side walls, which extend vertically from a bottom of the catch basin beyond a level at which the workpiece support is located such that the workpiece is located within the catch basin, below an uppermost surface of said side walls, thereby allowing the catch basin to be filled with water up to the workpiece.

2. The device according to claim 1, further comprising a cutting head, which is displaceably arranged, the at least one fluid jet is discharged from the cutting head in the machining process.

3. The device according to claim 2, wherein the cutting head is movably arranged in three translational axes.

4. The device according to claim 2, further comprising a machine support, on which the cutting head is displaceably arranged, wherein the workpiece support is fixedly connected to the machine support.

5. The device according to claim 4, wherein for its exchange, the workpiece support is detachably connected to the machine support.

6. The device according to claim 4, further comprising fastening elements, which are fastened to the machine support and on which the workpiece support is resting.

7. The device according claim 6, wherein the catch basin has passages, through which the fastening elements extend.

8. The device according to claim 7, further comprising seals for sealing the passages.

* * * * *